US009989356B2

United States Patent
Yamagata et al.

(10) Patent No.: US 9,989,356 B2
(45) Date of Patent: Jun. 5, 2018

(54) SHAPE MEASURING APPARATUS

(71) Applicant: MITUTOYO CORPORATION, Kanagawa (JP)

(72) Inventors: Masaoki Yamagata, Kanagawa (JP); Kentaro Nemoto, Kanagawa (JP); Eisuke Moriuchi, Kanagawa (JP); Tadashi Iwamoto, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 474 days.

(21) Appl. No.: 14/197,715

(22) Filed: Mar. 5, 2014

(65) Prior Publication Data

US 2014/0253724 A1 Sep. 11, 2014

(30) Foreign Application Priority Data

Mar. 8, 2013 (JP) ................................. 2013-047178

(51) Int. Cl.
*G01B 11/30* (2006.01)
*H04N 7/18* (2006.01)
(Continued)

(52) U.S. Cl.
CPC ............ *G01B 11/24* (2013.01); *G01B 11/005* (2013.01); *G01B 11/25* (2013.01)

(58) Field of Classification Search
CPC ................................ G01B 11/24; G01B 11/25
See application file for complete search history.

(56) References Cited

U.S. PATENT DOCUMENTS 5,450,201 A * 9/1995 Katzir ................ G01N 21/8806
356/369
5,993,002 A * 11/1999 Steinhuber ............. A61B 3/135
351/214

(Continued)

FOREIGN PATENT DOCUMENTS

CN 102466471 A 5/2012
EP 2538171 A 12/2012
(Continued)

OTHER PUBLICATIONS

U.S. Appl. No. 14/217,704 to Osamu Saito et al., which was filed Mar. 18, 2014.
(Continued)

*Primary Examiner* — Rebecca Volentine
(74) *Attorney, Agent, or Firm* — Greenblum & Bernstein, P.L.C.

(57) ABSTRACT

A shape measuring apparatus includes: an irradiating part configured to irradiate work with a linear line laser, the irradiating part including: a light source configured to produce laser light; a first optical member configured to linearly spread the laser light from the light source and generate the line laser; and a second optical member, provided between the light source and the first optical member, configured to adjust an area of irradiation with a line laser on the work; a first sensor configured to receive a line laser reflected by the work and capture an image of the work; a lens configured to form an image of a line laser reflected by the work on an imaging surface of the first sensor; and a control part configured to control adjustment of the area of irradiation with the line laser on the work by the second optical member.

12 Claims, 17 Drawing Sheets

(51) Int. Cl.
    *G01B 11/24*   (2006.01)
    *G01B 11/00*   (2006.01)
    *G01B 11/25*   (2006.01)

(56) References Cited

U.S. PATENT DOCUMENTS

| | | | | |
|---|---|---|---|---|
| 6,081,614 | A * | 6/2000 | Yamada | G03F 7/70358 |
| | | | | 382/141 |
| 8,553,234 | B2 | 10/2013 | Nemoto et al. | |
| 2002/0080242 | A1* | 6/2002 | Takahashi | H04N 5/217 |
| | | | | 348/207.99 |
| 2002/0180988 | A1* | 12/2002 | Johnston | G01B 11/24 |
| | | | | 356/602 |
| 2004/0004727 | A1 | 1/2004 | Yanagisawa et al. | |
| 2008/0165357 | A1* | 7/2008 | Stern | G01B 11/0608 |
| | | | | 356/364 |
| 2009/0073427 | A1* | 3/2009 | Hackney | G01B 11/2513 |
| | | | | 356/237.1 |
| 2009/0109526 | A1* | 4/2009 | Sander | G02B 21/22 |
| | | | | 359/385 |
| 2009/0244482 | A1* | 10/2009 | Elsner | A61B 3/1025 |
| | | | | 351/206 |
| 2010/0103400 | A1* | 4/2010 | Deguenther | G03F 7/70116 |
| | | | | 355/71 |
| 2010/0157269 | A1* | 6/2010 | Deguenther | G03F 7/702 |
| | | | | 355/67 |
| 2010/0182612 | A1* | 7/2010 | Yoshida | A61B 3/102 |
| | | | | 356/511 |
| 2010/0245882 | A1* | 9/2010 | Muller | B41F 33/0036 |
| | | | | 358/1.14 |
| 2012/0013898 | A1* | 1/2012 | Judell | G01N 21/21 |
| | | | | 356/237.2 |
| 2012/0262724 | A1 | 10/2012 | Nemoto et al. | |
| 2012/0262726 | A1* | 10/2012 | Nemoto | G01B 11/03 |
| | | | | 356/612 |
| 2012/0307260 | A1* | 12/2012 | Keshavmurthy | G01B 11/2441 |
| | | | | 356/610 |
| 2013/0141715 | A1* | 6/2013 | Urano | G01N 21/9501 |
| | | | | 356/237.2 |
| 2013/0301058 | A1* | 11/2013 | Nunnink | G01B 11/00 |
| | | | | 356/606 |
| 2014/0198322 | A1* | 7/2014 | Kim | G01B 11/24 |
| | | | | 356/625 |

FOREIGN PATENT DOCUMENTS

| | | |
|---|---|---|
| JP | 8-193810 A | 7/1996 |
| JP | 2004-037317 A | 2/2004 |
| JP | 2009-534969 | 9/2009 |
| JP | 2012-211842 A | 11/2012 |
| JP | 2012-225700 | 11/2012 |
| WO | 2007/125081 | 11/2007 |
| WO | WO 2012/042943 A1 | 4/2012 |

OTHER PUBLICATIONS

U.S. Appl. No. 14/184,132 to Masaoki Yamagata et al., which was filed Feb. 19, 2014.

Office Action issued in Japanese family member Patent Appl. No. 2013-047178, dated Oct. 25, 2016, along with an English translation thereof.

Office Action issued in Chinese family member Patent Appl. No. 20140084250.8, dated Jul. 28, 2017, along with an English language translation thereof.

* cited by examiner

SHAPE MEASURING APPARATUS

CROSS-REFERENCE TO RELATED APPLICATION(S)

This application is based upon and claims the benefit of priority from Japanese Patent Application No. 2013-047178, filed on Mar. 8, 2013, the entire contents of which are incorporated herein by reference.

BACKGROUND

1. Field of the Invention

The present invention relates to a shape measuring apparatus for measuring a shape of an object to be measured by irradiating the object to be measured with light and imaging the object to be measured.

2. Description of the Related Art

Conventionally, a shape measuring apparatus for measuring a surface shape of work by scanning a surface of the work by a probe and capturing position coordinates etc. of each part of the work is known.

Such a known shape measuring apparatus is a non-contact apparatus for making measurement without bringing a probe into contact with a surface of work as described in JP-T-2009-534969.

In the non-contact surface shape measuring apparatus described in JP-T-2009-534969, a surface shape of work is measured by irradiating a surface of the work with a linear line laser by a scanning probe and imaging this surface from a predetermined angle with respect to a direction of irradiation with the line laser. According to such a non-contact surface shape measuring apparatus, there is no fear of damaging the surface of the work and also considering an influence on measurement accuracy due to abrasion of the probe.

Also, an apparatus described in JP-A-2012-225700 images work using the Scheimpflug principle. By using this principle, the area of irradiation with a line laser on an imaging element changes according to a distance between a light source and the work while focus can be achieved over a wide range. Accordingly, measurement accuracy of the shape measuring apparatus decreases.

SUMMARY

An object of the invention is to provide a shape measuring apparatus capable of making high-accuracy measurement.

A shape measuring apparatus according to the invention has an irradiating part, a first sensor and a lens. The irradiating part irradiates work with a linear line laser. The first sensor receives a line laser reflected by the work and captures an image of the work. The lens forms an image of a line laser reflected by the work on an imaging surface of the first sensor. A first surface extending the imaging surface, a second surface extending a principal plane of the lens and a third surface extending a surface of irradiation with the line laser intersect at one point. The irradiating part has a light source, a first optical member and a second optical member. The light source produces laser light. The first optical member linearly spreads the laser light from the light source and generates the line laser. The second optical member is formed between the light source and the first optical member and is constructed so that an area of irradiation with a line laser on the work can be adjusted. The shape measuring apparatus further includes a control part for controlling adjustment of the area of irradiation with the line laser on the work by the second optical member.

According to this invention, the shape measuring apparatus capable of making high-accuracy measurement can be provided.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

Figure 1:
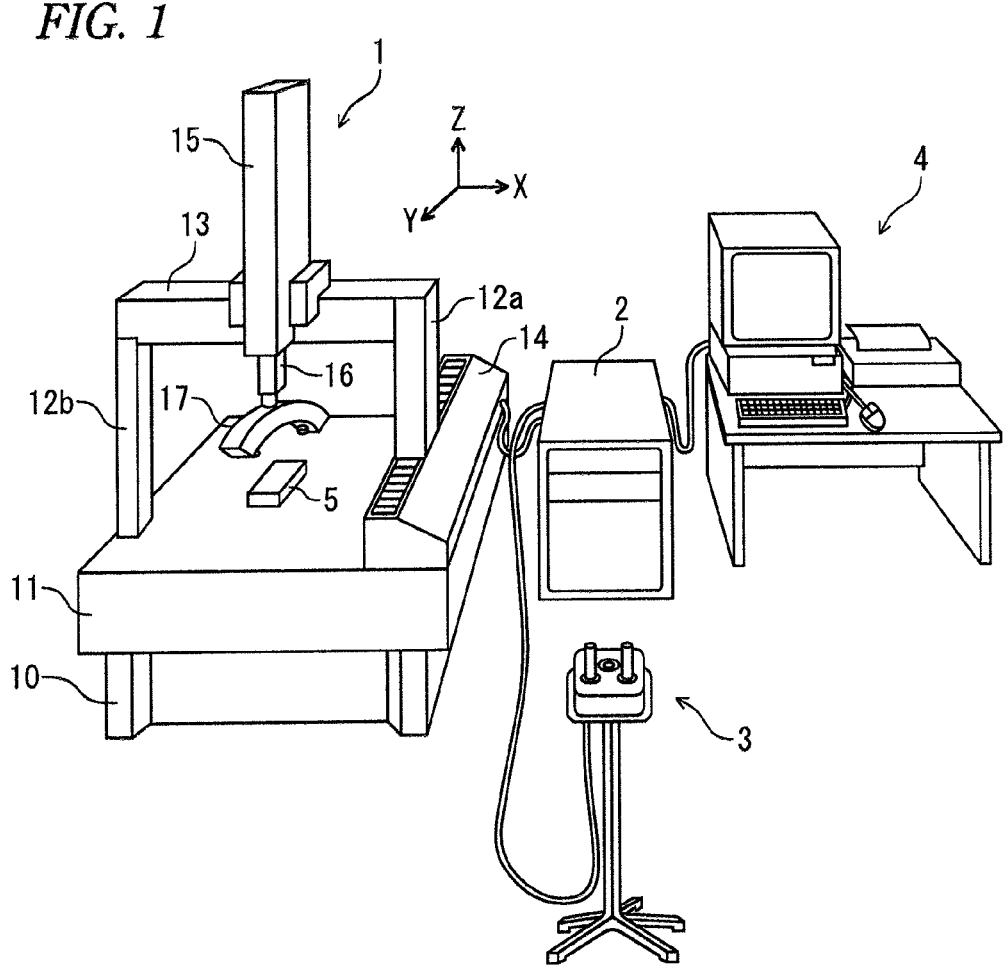
FIG. 1 is the overall diagram of a system constructing a shape measuring apparatus according to a first embodiment.

A shape measuring apparatus according to a first embodiment of the invention will be described in detail with reference to the drawings. FIG. 1 is the overall diagram of a system constructing the shape measuring apparatus according to the first embodiment. This shape measuring apparatus is constructed by attaching an optical probe 17 according to the present embodiment as a measurement probe of a coordinate measuring machine 1 as shown in FIG. 1. This shape measuring apparatus includes a motion controller 2, an operation panel 3, and a host system 4. The motion controller 2 drives and controls the coordinate measuring machine 1 and also, captures a necessary measured coordinate value from this coordinate measuring machine 1. The operation panel 3 manually operates this coordinate measuring machine 1 through this motion controller 2. The host system 4 edits and executes a part program for instructing a measurement procedure in the motion controller 2. Also, the host system 4 has a function of doing calculation for fitting a geometric shape to the measured coordinate value captured through the motion controller 2, or recording or sending the part program.

The coordinate measuring machine 1 is constructed as described below. That is, a surface plate 11 is placed on an anti-vibration table 10 so that an upper surface of the surface plate 11 matches with a horizontal plane as a base surface, and an X-axis guide 13 is supported on the upper ends of arm support bodies 12a, 12b erected from both side ends of this surface plate 11. The lower end of the arm support body 12a is driven in a Y-axis direction by a Y-axis driving mechanism 14, and the lower end of the arm support body 12b is supported on the surface plate 11 movably in the Y-axis direction by air bearings. The X-axis guide 13 drives a Z-axis guide 15 extending vertically in an X-axis direction. The Z-axis guide 15 is provided with a Z-axis arm 16 so as to be driven along the Z-axis guide 15, and the non-contact optical probe 17 is attached to the lower end of the Z-axis arm 16. In addition, the optical probe 17 may be rotatable in a horizontal plane or a vertical plane.

Figure 2:
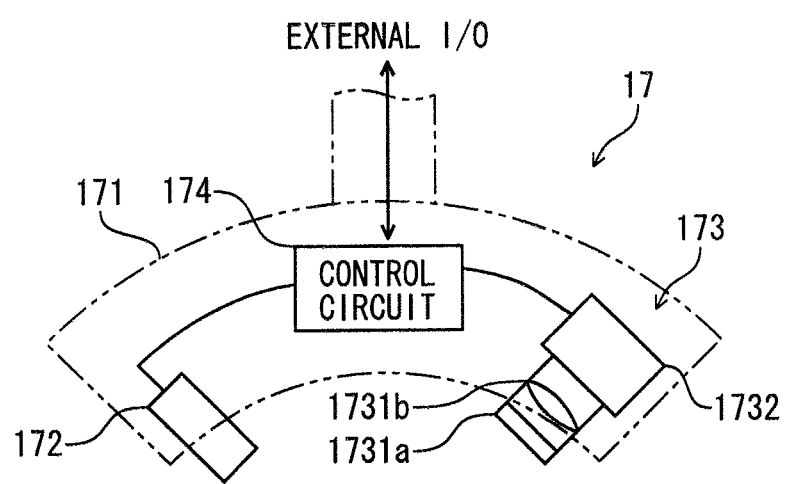
FIG. 2 is a diagram showing a configuration of an optical probe 17 according to the first embodiment.

FIG. 2 shows a configuration of the optical probe 17 according to the present embodiment. The optical probe 17 has a chassis 171, a laser light generating part 172 arranged inside the chassis 171, an imaging device 173 for capturing work, and a control circuit 174 for adjusting the laser light generating part 172 as shown in FIG. 2. In addition, a detailed configuration of the laser light generating part 172 and control of the configuration will be described below.

The laser light generating part 172 irradiates work 5 with a linear line laser extending in a direction orthogonal to a plane formed by the optical axis (the optical axis in the center of a scanning direction) of the laser light generating part 172 and the optical axis of the imaging device 173, and linearly illuminates a surface of the work 5.

The imaging device 173 has a band-pass filter 1731a, a lens 1731b, and a CMOS sensor 1732 for capturing an image of the work 5 through the band-pass filter and the lens. The imaging device 173 is arranged in a direction of receiving light from a direction of forming a predetermined angle with respect to a direction of irradiating the work 5 with light from a light source. That is, the line laser applied to the surface of the work 5 and reflected along a shape of the surface of the work 5 is received from a predetermined angle by the imaging device 173.

Figure 3A:
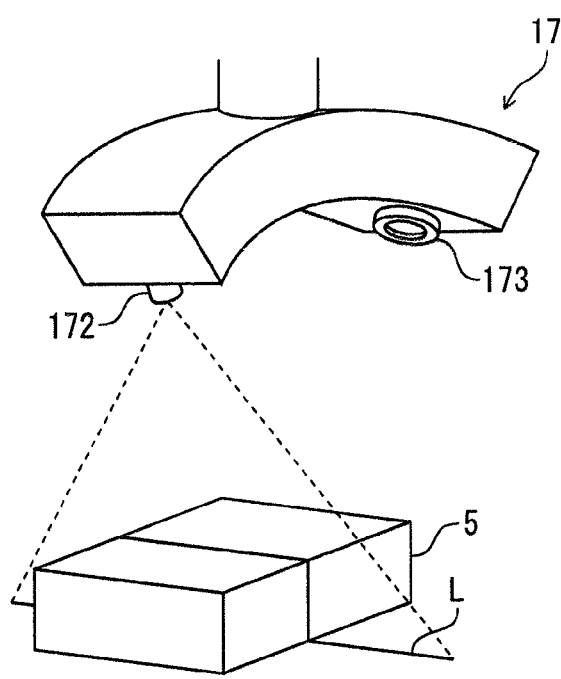
FIGS. 3A and 3B are schematic diagrams showing a line laser applied using the optical probe 17.
Figure 3B:
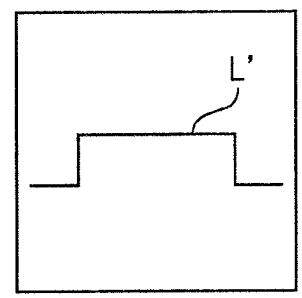

FIGS. 3A and 3B are schematic diagrams showing a line laser applied using the optical probe 17. As shown in FIG. 3A, when the work 5 is irradiated with a linear line laser L by the laser light generating part 172, reflected light L' of the line laser is deformed along the surface of the work 5, and a contour at the time of cutting the work 5 in a certain plane is sectioned by the reflected light L'. The imaging device 173 captures an image of the work 5 at a predetermined angle from a direction of irradiation with laser light of the laser light generating part 172, and captures an image of the reflected light L' as shown in FIG. 3B.

Figure 4:
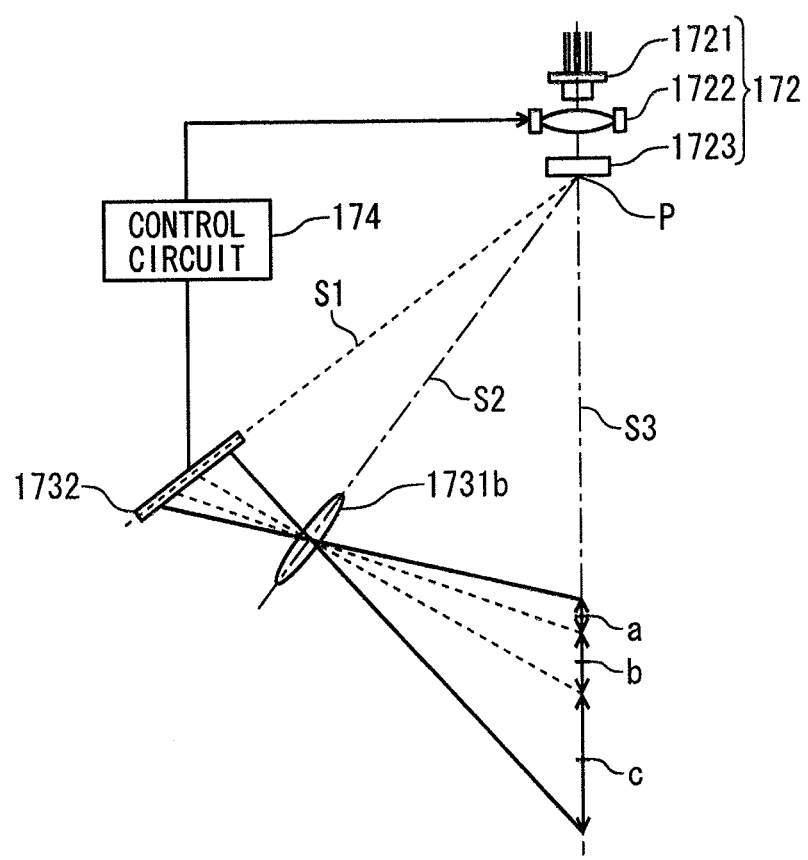
FIG. 4 is a schematic diagram showing a configuration of a laser light generating part 172 and arrangement of the inside of the optical probe 17 according to the first embodiment.

FIG. 4 is a schematic diagram showing a configuration of the laser light generating part 172 and arrangement of the inside of the optical probe 17. In addition, the band-pass filter 1731a is omitted in FIG. 4. As shown in FIG. 4, the laser light generating part 172 includes a light source 1721, a tunable lens 1722, and a beam expander 1723. A laser emitted from the light source 1721 passes through the tunable lens 1722 and is spread by the beam expander 1723 to generate a line laser. That is, the tunable lens 1722 is formed between the light source 1721 and the beam expander 1723. It is constructed so that a curvature of the tunable lens 1722 can be adjusted by the control circuit 174 based on an image captured by the CMOS sensor 1732. Accordingly, a focal length of the line laser is adjusted. In addition, the beam expander 1723 is, for example, a rod lens or a cylindrical lens.

Also, the optical probe 17 according to the present embodiment uses the Scheimpflug principle and as shown in FIG. 4, surfaces S1 to S3 respectively extending an imaging surface S1 of the CMOS sensor 1732, a principal plane S2 including a principal point of the lens 1731b, and a surface S3 of irradiation with the line laser with which the work 5 is irradiated intersect at one point P. By such arrangement, focus is achieved on the whole imaging surface of the CMOS sensor 1732.

However, since the present embodiment uses the Scheimpflug principle as described above, an optical magnification varies depending on a position of irradiation with the line laser on the work 5. For example, in FIG. 4, the optical magnification is high in an irradiation position a near to the laser light generating part 172, and the optical magnification is low in an irradiation position c far from the laser light generating part 172. In an irradiation position b between the irradiation positions a and c, the optical magnification between the optical magnifications in the irradiation positions a and c is obtained. Consequently, an area of irradiation with the line laser on the CMOS sensor 1732 changes according to the irradiation position, and this causes measurement accuracy to worse. In the present embodiment, control of the tunable lens 1722 described below solves this problem.

Figure 5:
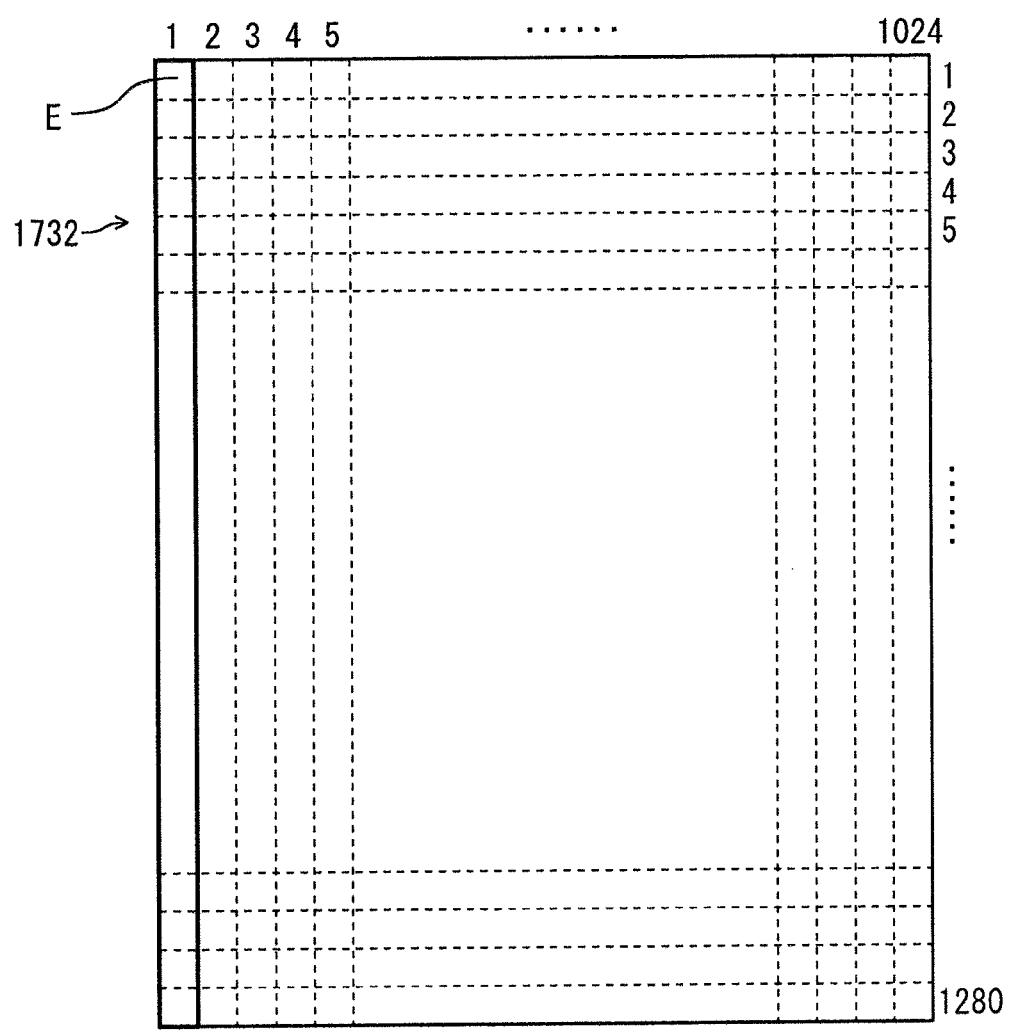
FIG. 5 is a pattern diagram showing a CMOS sensor 1732 according to the first embodiment.

FIG. 5 is a pattern diagram showing the CMOS sensor 1732 according to the first embodiment. The CMOS sensor 1732 has 2D array of pixel sensors as shown in FIG. 5. For example, in the present embodiment, the CMOS sensor 1732 has 1024 light receiving elements E in a direction of extension of the linear line laser and 1280 light receiving elements E in a direction orthogonal to this direction of extension. Also, the CMOS sensor 1732 has a rolling shutter function. The rolling shutter function refers to a method in which only the light receiving elements E arranged in one or more rows (or columns) receive light simultaneously and the light in this row unit (or column unit) is sequentially received in a column direction (or row direction). For example, in FIG. 5, the light receiving elements E (light receiving elements highlighted by a thick frame) arranged in the first column receive light simultaneously. When this light receiving operation is ended, light receiving operations are sequentially performed in the second column, the third column and so on.

Figure 6:
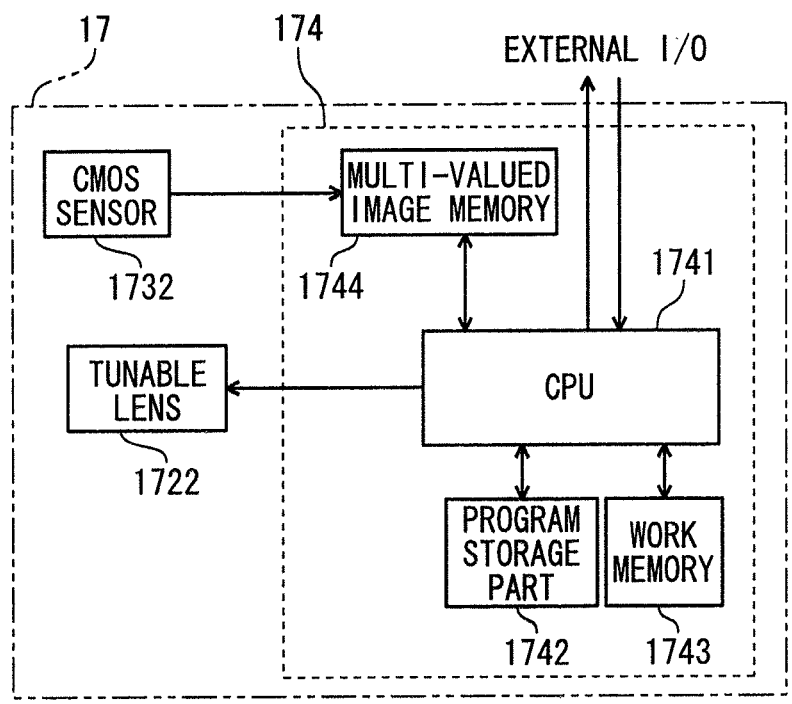
FIG. 6 is a block diagram representing a control system of the optical probe 17.

FIG. 6 is a block diagram representing a control system of the optical probe 17 according to the present embodiment. The control circuit 174 has a CPU 1741, a program storage part 1742 connected to the CPU 1741, a work memory 1743, and a multi-valued image memory 1744 as shown in FIG. 6. Image information acquired in the CMOS sensor 1732 is inputted to the CPU 1741 through the multi-valued image memory 1744. The CPU 1741 controls the tunable lens 1722 based on an image acquired in the CMOS sensor 1732.

Figure 7:
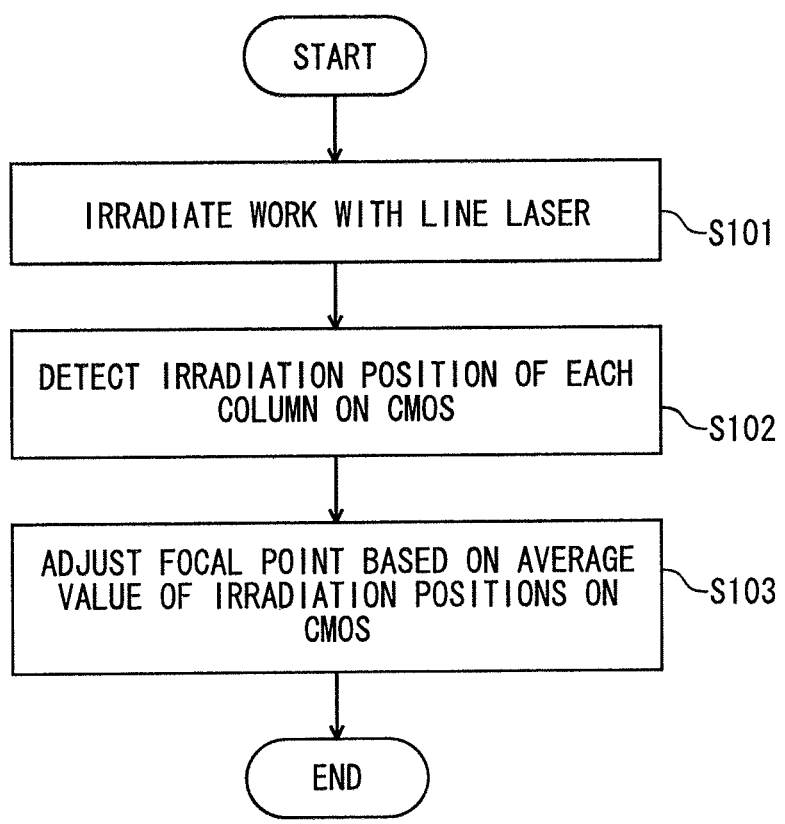
FIG. 7 is a flowchart showing operation of the shape measuring apparatus according to the first embodiment.

Next, operation of the shape measuring apparatus according to the first embodiment will be described with reference to FIG. 7. FIG. 7 is a flowchart showing the operation of the shape measuring apparatus according to the first embodiment. As shown in FIG. 7, the control circuit 174 irradiates the work 5 with a line laser (S101). Then, the control circuit 174 detects an irradiation position in each column of the CMOS sensor 1732 (S102). By this irradiation position, a distance between the light source 1721 and the irradiation position on the work 5 is detected. Then, the control circuit 174 controls a curvature of the tunable lens 1722 based on an average value of the irradiation positions on the CMOS sensor 1732, and adjusts a focal position (S103).

Figure 8:
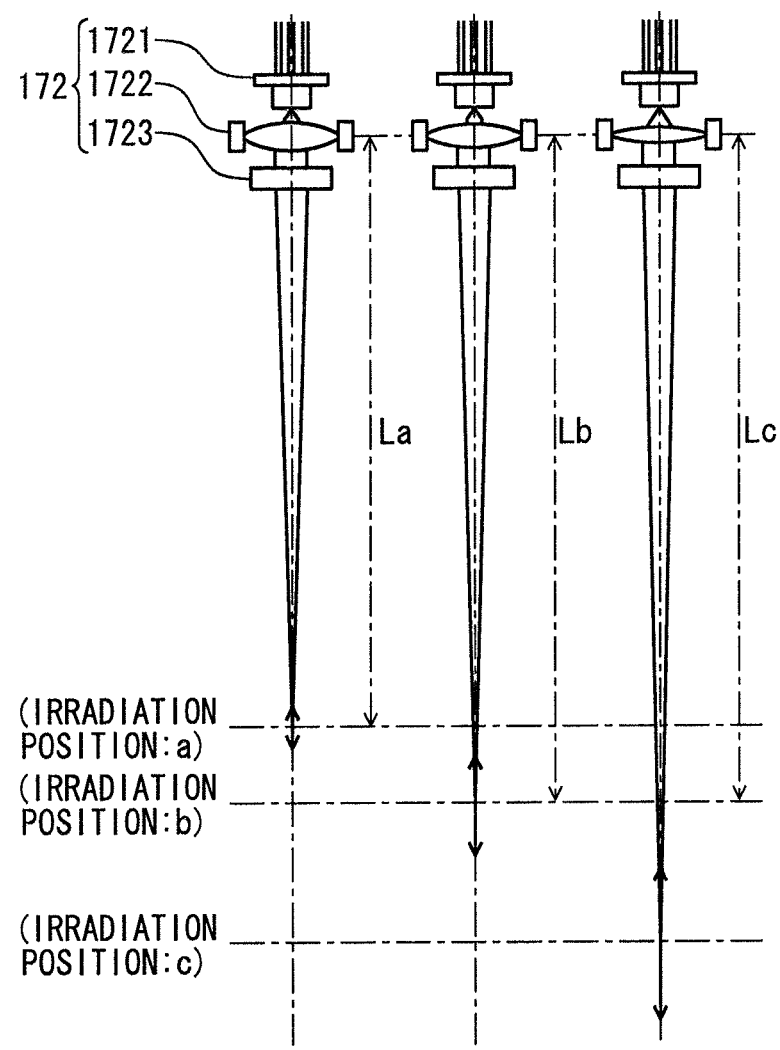
FIG. 8 is a schematic diagram showing control by a tunable lens 1722 according to the first embodiment.

The adjustment in step S103 is made as shown in FIG. 8. In addition, in FIG. 8, an irradiation position b is nearer to the laser light generating part 172 than an irradiation position c, and an irradiation position a is nearer to the laser light generating part 172 than the irradiation position b.

As shown in FIG. 8, as the position of irradiation with the line laser on the work 5 is nearer to the laser light generating part 172 (light source 1721), the curvature of the tunable lens 1722 is adjusted larger and the focal length is adjusted shorter. Concretely, the curvature of the tunable lens 1722 in the case of irradiating the irradiation position b is adjusted larger than the curvature of the tunable lens 1722 in the case of irradiating the irradiation position c. Similarly, the curvature of the tunable lens 1722 in the case of irradiating the irradiation position a is adjusted larger than the curvature of the tunable lens 1722 in the case of irradiating the irradiation position b. Accordingly, the focal length Lb in the case of irradiating the irradiation position b is adjusted shorter than the focal length Lc in the case of irradiating the irradiation position c. Similarly, the focal length La in the case of irradiating the irradiation position a is adjusted shorter than the focal length Lb in the case of irradiating the irradiation position b.

By the control of the tunable lens 1722 described above, the first embodiment adjusts the area of irradiation with the line laser on the work 5 based on the distance between the light source 1721 and the irradiation position on the work 5. Or, the area of irradiation may be adjusted based on, for example, a coordinate position (pixel position) in which the line laser on the CMOS sensor 1732 is imaged, a light intensity or a line width of the line laser imaged. Consequently, by thinly narrowing the line width of the applied line laser in any irradiation position on the work 5 to a maximum extent of the capability of an optical system of the laser light generating part 172, the first embodiment can reduce variations in the area of irradiation with the line laser imaged on the CMOS sensor 1732 to improve measurement accuracy. For example, the first embodiment can improve accuracy of measurement by unevenness of a surface of the work 5.

Second Embodiment

Figure 9:
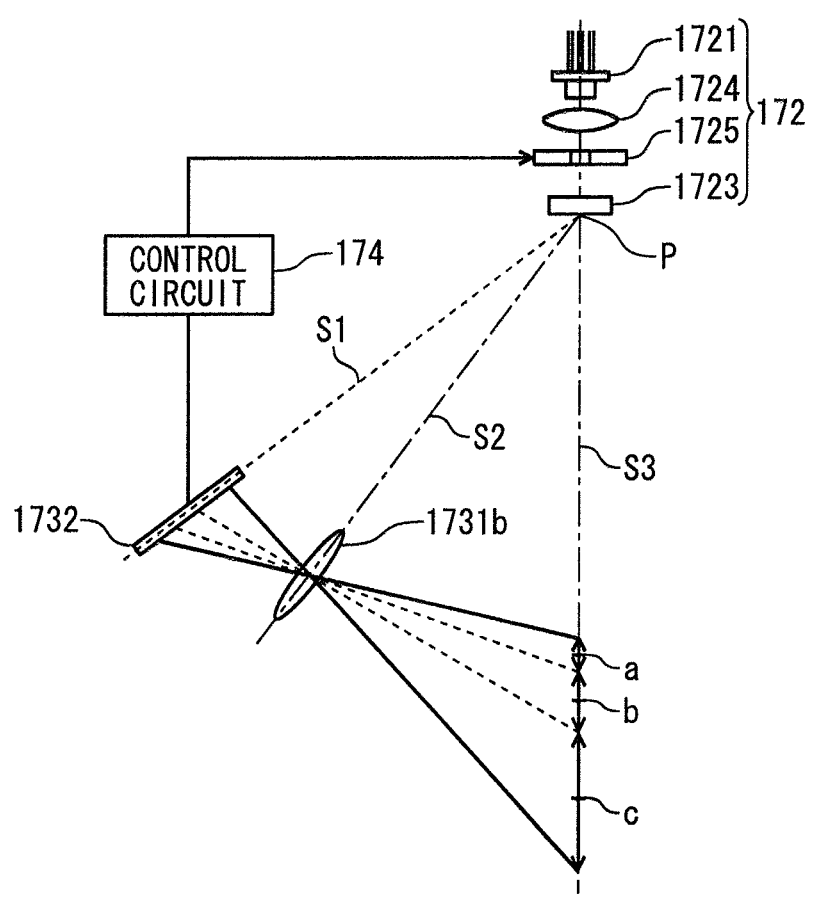
FIG. 9 is a schematic diagram showing a configuration of a laser light generating part 172 and arrangement of the inside of an optical probe 17 according to a second embodiment.

Next, a shape measuring apparatus according to a second embodiment will be described. In the shape measuring apparatus according to the second embodiment, instead of the tunable lens 1722 of the first embodiment, a collimator lens 1724 is formed and an electric aperture 1725 is formed between its collimator lens 1724 and a beam expander 1723 as shown in FIG. 9. It is constructed so that an aperture diameter of the electric aperture 1725 can be adjusted by a control circuit 174 based on an image captured by a CMOS sensor 1732.

Figure 10:
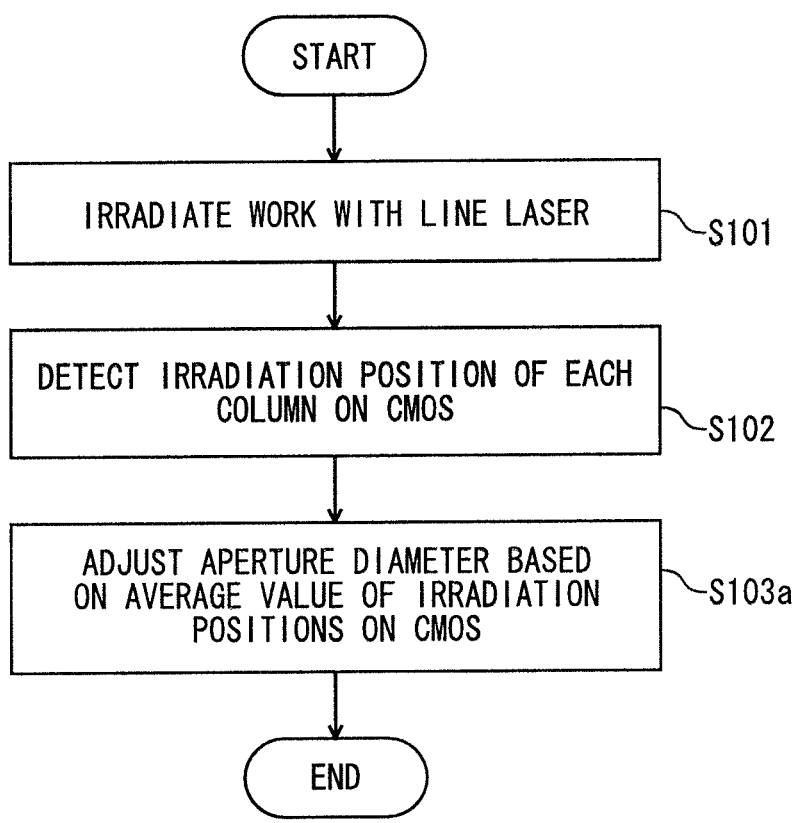
FIG. 10 is a flowchart showing operation of a shape measuring apparatus according to the second embodiment.

Next, operation of the shape measuring apparatus according to the second embodiment will be described with reference to FIG. 10. FIG. 10 is a flowchart showing the operation of the shape measuring apparatus according to the second embodiment. As shown in FIG. 10, steps S101 and S102 similar to those of the first embodiment are executed. Then, the control circuit 174 controls an aperture diameter of the electric aperture 1725 based on an average value of irradiation positions on the CMOS sensor 1732 (S103a).

Figure 11:
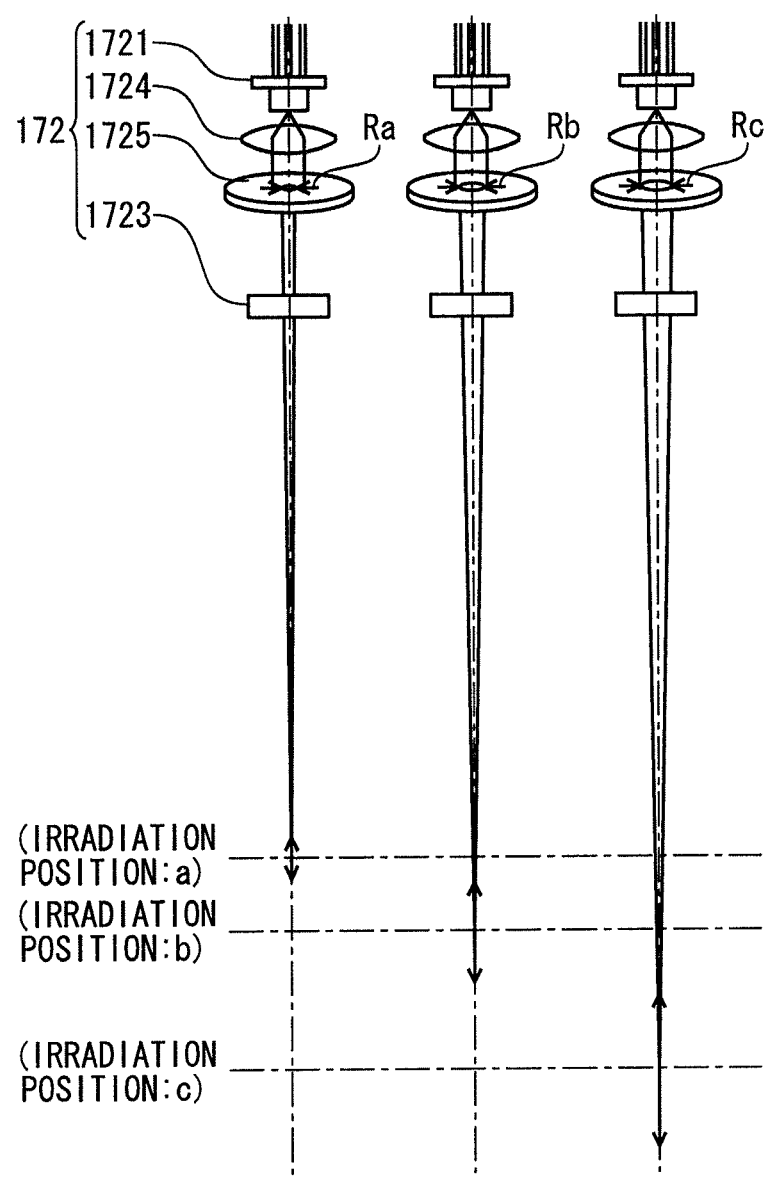
FIG. 11 is a schematic diagram showing control by an electric aperture 1725 according to the second embodiment.

Adjustment in step S103a is made as shown in FIG. 11. In addition, in FIG. 11, an irradiation position b is nearer to a laser light generating part 172 than an irradiation position c, and an irradiation position a is nearer to the laser light generating part 172 than the irradiation position b.

As shown in FIG. 11, as the position of irradiation with a line laser on work 5 is nearer to the laser light generating part 172 (light source 1721), the aperture diameter of the electric aperture 1725 is adjusted smaller. Concretely, an aperture diameter Rb of the electric aperture 1725 in the case of irradiating the irradiation position b is adjusted smaller than an aperture diameter Rc of the electric aperture 1725 in the case of irradiating the irradiation position c. Similarly, an aperture diameter Ra of the electric aperture 1725 in the case of irradiating the irradiation position a is adjusted smaller than the aperture diameter Rb of the electric aperture 1725 in the case of irradiating the irradiation position b.

By the control of the electric aperture 1725 described above, the second embodiment adjusts an area of irradiation with the line laser on the work 5 based on a distance between the light source 1721 and the irradiation position on the work 5. Or, the area of irradiation may be adjusted based on, for example, a coordinate position (pixel position) in which the line laser on the CMOS sensor 1732 is imaged, a light intensity or a line width of the line laser imaged. Consequently, by thinly narrowing the line width of the applied line laser in any irradiation position on the work 5 to a maximum extent of the capability of an optical system of the laser light generating part 172, the second embodiment can reduce variations in the area of irradiation with the line laser imaged on the CMOS sensor 1732 to improve measurement accuracy.

Third Embodiment

Figure 12:
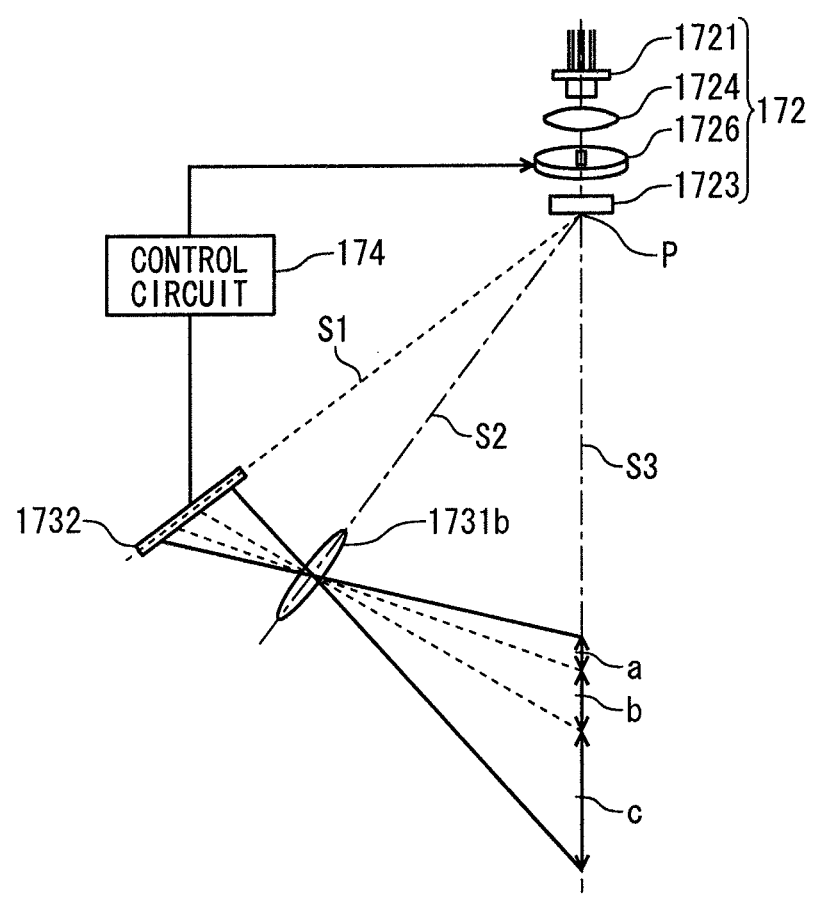
FIG. 12 is a schematic diagram showing a configuration of a laser light generating part 172 and arrangement of the inside of an optical probe 17 according to a third embodiment.

Next, a shape measuring apparatus according to a third embodiment will be described. In the shape measuring apparatus according to the third embodiment, instead of the electric aperture 1725 of the second embodiment, a variable slit 1726 is formed as shown in FIG. 12. It is constructed so that a gap of the variable slit 1726 can be adjusted by a control circuit 174 based on an image captured by a CMOS sensor 1732.

Figure 13:
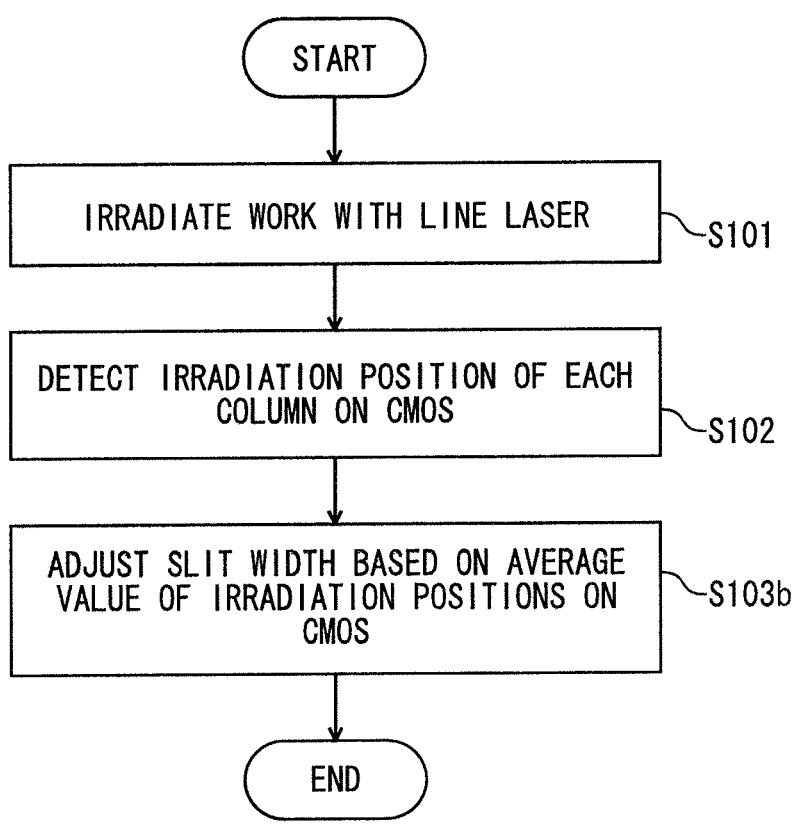
FIG. 13 is a flowchart showing operation of a shape measuring apparatus according to the third embodiment.

Next, operation of the shape measuring apparatus according to the third embodiment will be described with reference to FIG. 13. FIG. 13 is a flowchart showing the operation of the shape measuring apparatus according to the third embodiment. As shown in FIG. 13, steps S101 and S102 similar to those of the first embodiment are executed. Then, the control circuit 174 controls a gap of the variable slit 1726 based on an average value of irradiation positions on the CMOS sensor 1732 (S103b).

Figure 14:
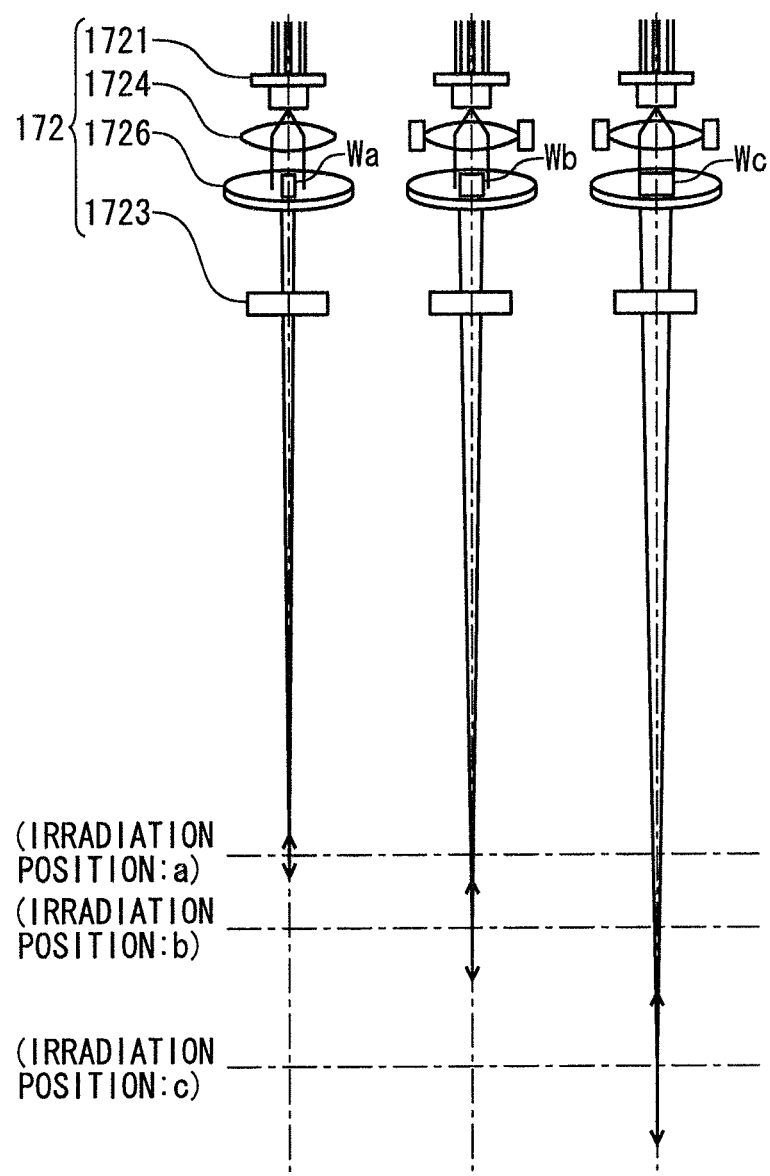
FIG. 14 is a schematic diagram showing control by a variable slit 1726 according to the third embodiment.

Adjustment in step S103b is made as shown in FIG. 14. In addition, in FIG. 14, an irradiation position b is nearer to a laser light generating part 172 than an irradiation position c, and an irradiation position a is nearer to the laser light generating part 172 than the irradiation position b.

As shown in FIG. 14, as the position of irradiation with a line laser on work 5 is nearer to the laser light generating part 172 (light source 1721), the gap of the variable slit 1726 is adjusted smaller. Concretely, a gap Wb of the variable slit 1726 in the case of irradiating the irradiation position b is adjusted smaller than a gap Wc of the variable slit 1726 in the case of irradiating the irradiation position c. Similarly, a gap Wa of the variable slit 1726 in the case of irradiating the irradiation position a is adjusted smaller than the gap Wb of the variable slit 1726 in the case of irradiating the irradiation position b.

By the control of the variable slit 1726 described above, the third embodiment adjusts an area of irradiation with the line laser on the work 5 based on a distance between the light source 1721 and the irradiation position on the work 5. Or, the area of irradiation may be adjusted based on, for example, a coordinate position (pixel position) in which the line laser on the CMOS sensor 1732 is imaged, a light intensity or a line width of the line laser imaged. Consequently, by thinly narrowing the line width of the applied line laser in any irradiation position on the work 5 to a maximum extent of the capability of an optical system of the laser light generating part 172, the third embodiment can reduce variations in the area of irradiation with the line laser imaged on the CMOS sensor 1732 to improve measurement accuracy.

Fourth Embodiment

Figure 15:
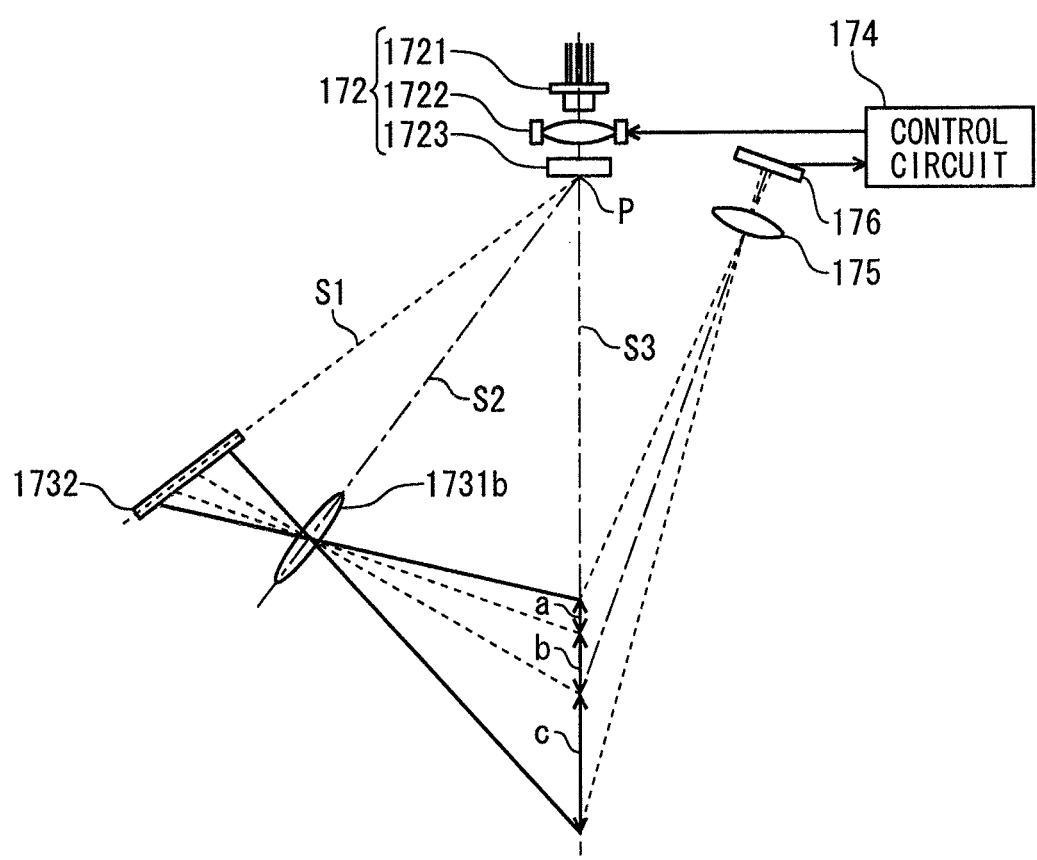
FIG. 15 is a schematic diagram showing a configuration of a laser light generating part 172 and arrangement of the inside of an optical probe 17 according to a fourth embodiment.

Next, a shape measuring apparatus according to a fourth embodiment will be described. The shape measuring apparatus according to the fourth embodiment has a collective lens 175 and a light position detecting part 176 in addition to the configuration of the first embodiment as shown in FIG. 15. This light position detecting part 176 can be constructed of a one-dimensional optical sensor such as PSD or a line sensor. The light position detecting part 176 receives reflected light from work 5 through the collective lens 175. The light position detecting part 176 detects a position of light in a direction orthogonal to a direction of extension of a line laser one-dimensionally. It is constructed so that a curvature of a tunable lens 1722 can be adjusted by a control circuit 174 based on the light detected by the light position detecting part 176. Accordingly, a focal length of the line laser is adjusted.

Figure 16:
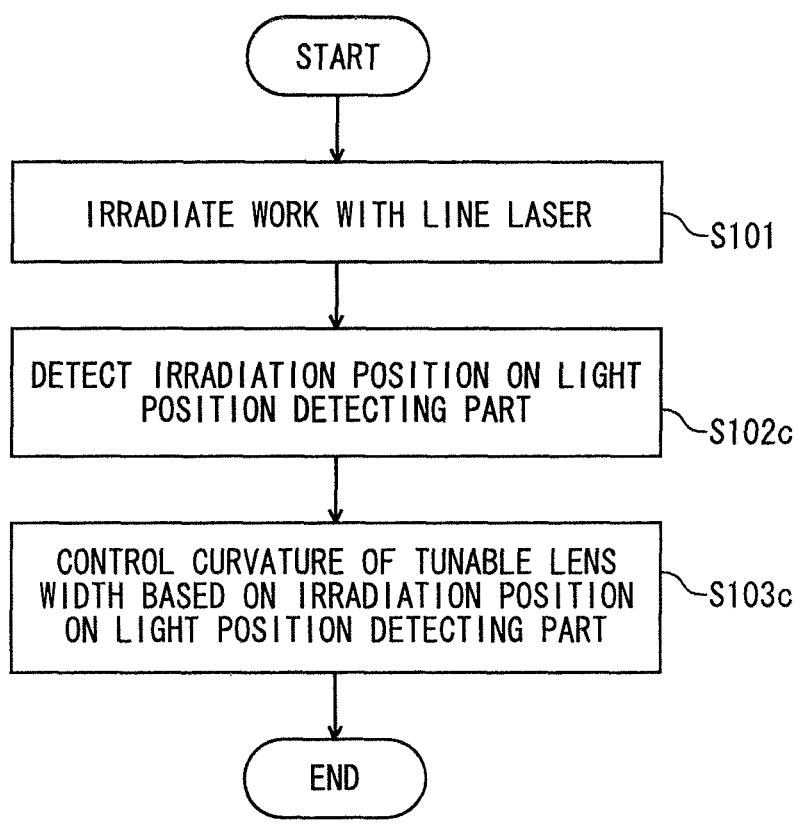
FIG. 16 is a flowchart showing operation of a shape measuring apparatus according to the fourth embodiment.

Next, operation of the shape measuring apparatus according to the fourth embodiment will be described with reference to FIG. 16. FIG. 16 is a flowchart showing the operation of the shape measuring apparatus according to the fourth embodiment. As shown in FIG. 16, step S101 similar to that of the first embodiment is executed. Then, the control circuit 174 detects an irradiation position on the light position detecting part 176 (S102*c*). By this irradiation position, a distance between a light source 1721 and the irradiation position on the work 5 is detected. Subsequently, the control circuit 174 controls a curvature of the tunable lens 1722 based on the irradiation position on the light position detecting part 176, and adjusts a focal length (S103*c*).

By the control described above, the fourth embodiment has an effect similar to that of the first embodiment. That is, by thinly narrowing a line width of the applied line laser in any irradiation position on the work 5 to a maximum extent of the capability of an optical system of a laser light generating part 172, the fourth embodiment can reduce variations in an area of irradiation with the line laser imaged on a CMOS sensor 1732 to improve measurement accuracy. Also, separately from the CMOS sensor 1732, the fourth embodiment is provided with the light position detecting part 176 to thereby adjust the focal length. Consequently, the fourth embodiment can reduce a load on the CMOS sensor 1732 to improve a processing speed.

Other Embodiment

One embodiment of the shape measuring apparatus according to the invention has been described above, but the invention is not limited to the embodiments described above, and various changes, additions, replacements, etc. can be made without departing from the gist of the invention.

Figure 17:
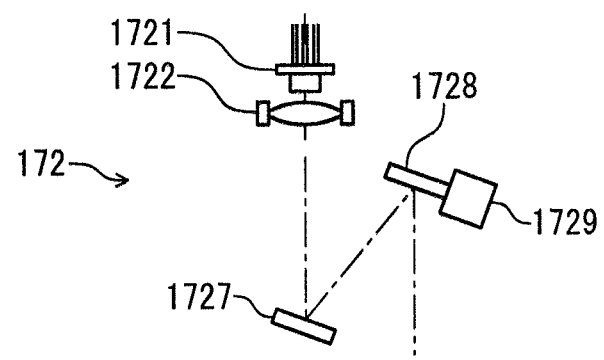
FIG. 17 is a schematic diagram showing a laser light generating part 172 according to another embodiment.

For example, as shown in FIG. 17, a laser light generating part 172 may be configured to have a mirror 1727 and a galvano-mirror 1728 instead of a beam expander 1723. The mirror 1727 reflects irradiation light from a light source 1721 to the galvano-mirror 1728. The galvano-mirror 1728 rotates within a predetermined angular range by a galvanometer 1729.

Also, the first to fourth embodiments may adjust an area of irradiation with a line laser on work 5 based on an area of irradiation with a line laser on a CMOS sensor 1732. Also, a configuration of arrangement of the light position detecting part 176 according to the fourth embodiment can be applied to the second and third embodiments.

What is claimed is:

1. A shape measuring apparatus comprising:
   an irradiator configured to irradiate work with a linear line laser, the irradiator including:
      a light source configured to produce laser light;
      a first optical element configured to linearly spread the laser light from the light source and generate the line laser; and
      a tunable lens, provided between the light source and the first optical element, configured to adjust an area of irradiation with a line laser on the work;
   a first sensor configured to receive a line laser reflected by the work and capture an image of the work;
   a lens configured to form an image of a line laser reflected by the work on an imaging surface of the first sensor; and
   a controller configured to control adjustment of the area of irradiation with the line laser on the work by controlling a focal length of the tunable lens so that a first surface extending the imaging surface, a second surface extending a principal plane of the lens and a third surface extending a surface of irradiation with the line laser intersect at one point, wherein the controller adjusts the focal length based on an average value of an irradiation position of the line laser.

2. The shape measuring apparatus according to claim 1, wherein:
   the first sensor includes 2D array of pixel sensors in a first direction and a second direction;
   the first direction is a direction of extension of the line laser and the second direction is a direction orthogonal to the first direction; and
   the controller adjusts the tunable lens based on a line laser imaged on an imaging surface of the first sensor.

3. The shape measuring apparatus according to claim 1, further comprising
   a second sensor configured to receive a line laser reflected by the work and capture an image of the work, wherein:

the second sensor detects a position of light in a first direction one-dimensionally;

the first direction is a direction orthogonal to a direction of extension of the line laser; and the controller is configured to adjust the tunable lens based on a line laser imaged on an imaging surface of the second sensor.

4. The shape measuring apparatus according to claim 1, wherein the controller adjusts the focal length shorter as a position of irradiation with the line laser on the work is nearer to the light source.

5. A shape measuring apparatus comprising:
an irradiator configured to irradiate work with a linear line laser, the irradiator including:
a light source configured to produce laser light;
a beam expander configured to linearly spread the laser light from the light source and generate the line laser;
a collimator lens; and
an aperture provided between the collimator lens and the beam expander, and configured to adjust an area of irradiation with a line laser on the work;
a first sensor configured to receive a line laser reflected by the work and capture an image of the work;
a lens configured to form an image of a line laser reflected by the work on an imaging surface of the first sensor; and
a controller configured to control adjustment of the area of irradiation with the line laser on the work by controlling an aperture diameter of the aperture so that a first surface extending the imaging surface, a second surface extending a principal plane of the lens and a third surface extending a surface of irradiation with the line laser intersect at one point, wherein the controller adjusts the aperture diameter based on an average value of an irradiation position of the line laser.

6. The shape measuring apparatus according to claim 5, wherein the controller adjusts the aperture diameter smaller as a position of irradiation with the line laser on the work is nearer to the light source.

7. The shape measuring apparatus according to claim 5 wherein:
the first sensor includes a 2D array of pixel sensors in a first direction and a second direction;
the first direction is a of direction of extension of the line laser and the second direction is a direction orthogonal to the first direction; and
the controller adjusts the aperture based on a line laser imaged on an imaging surface of the first sensor.

8. The shape measuring apparatus according to claim 5, further comprising:
a second sensor configured to receive a line laser reflected by the work and capture an image of the work, wherein:
the second sensor detects a position of light in a first direction one-dimensionally;

the first direction is a direction orthogonal to a direction of extension of the line laser; and the controller is configured to adjust the aperture based on a line laser imaged on an imaging surface of the second sensor.

9. A shape measuring apparatus comprising:
an irradiator configured to irradiate work with a linear line laser, the irradiator including:
a light source configured to produce laser light;
a beam expander configured to linearly spread the laser light from the light source and generate the line laser; and
a slit provided between the light source and the beam expander, and configured to adjust an area of irradiation with a line laser on the work;
a first sensor configured to receive a line laser reflected by the work and capture an image of the work;
a lens configured to form an image of a line laser reflected by the work on an imaging surface of the first sensor; and
a controller configured to control adjustment of the area of irradiation with the line laser on the work by controlling a gap in the slit so that a first surface extending the imaging surface, a second surface extending a principal plane of the lens and a third surface extending a surface of irradiation with the line laser intersect at one point, wherein the controller adjusts the gap based on an average value of an irradiation position of the line laser.

10. The shape measuring apparatus according to claim 9, wherein the controller adjusts the gap smaller as a position of irradiation with the line laser on the work is nearer to the light source.

11. The shape measuring apparatus according to claim 9, wherein:
the first sensor includes a 2D array of pixel sensors in a first direction and a second direction;
the first direction is a of direction of extension of the line laser and the second direction is a direction orthogonal to the first direction; and
the controller adjusts the gap based on a line laser imaged on an imaging surface of the first sensor.

12. The shape measuring apparatus according to claim 9, further comprising
a second sensor configured to receive a line laser reflected by the work and capture an image of the work, wherein:
the second sensor detects a position of light in a first direction one-dimensionally;
the first direction is a direction orthogonal to a direction of extension of the line laser; and
the controller is configured to adjust the gap based on a line laser imaged on an imaging surface of the second sensor.

* * * * *

UNITED STATES PATENT AND TRADEMARK OFFICE
CERTIFICATE OF CORRECTION

PATENT NO.        : 9,989,356 B2
APPLICATION NO.   : 14/197715
DATED             : June 5, 2018
INVENTOR(S)       : M. Yamagata et al.

Page 1 of 1

It is certified that error appears in the above-identified patent and that said Letters Patent is hereby corrected as shown below:

In the Claims

At Column 9, Line 44 (Claim 7, Line 5), please change "is a of" to -- is a --.
At Column 10, Line 37 (Claim 11, Line 5), please change "is a of" to -- is a --.

Signed and Sealed this
Eleventh Day of December, 2018

Andrei Iancu
*Director of the United States Patent and Trademark Office*